(12) United States Patent
Shahi et al.

(10) Patent No.: US 8,408,878 B2
(45) Date of Patent: Apr. 2, 2013

(54) FLOW CONTROL FOR FLUID HANDLING SYSTEM

(75) Inventors: Prakash B. Shahi, St. Louis, MO (US); Mark E. Carrier, Wildwood, MO (US); Randy L. Bomkamp, Creve Coeur, MO (US); Christopher D. Schock, O'Fallon, MO (US)

(73) Assignee: Nidec Motor Corporation, St. Louis, MO (US)

( * ) Notice: Subject to any disclaimer, the term of this patent is extended or adjusted under 35 U.S.C. 154(b) by 1133 days.

(21) Appl. No.: 12/211,979

(22) Filed: Sep. 17, 2008

(65) Prior Publication Data

US 2010/0068070 A1 Mar. 18, 2010

(51) Int. Cl.
*F04B 49/00* (2006.01)

(52) U.S. Cl. .......................................................... 417/1

(58) Field of Classification Search .................... 417/42, 417/44.11, 53; 73/702
See application file for complete search history.

(56) References Cited

U.S. PATENT DOCUMENTS

| | | | |
|---|---|---|---|
| 5,736,823 A * | 4/1998 | Nordby et al. | 318/432 |
| 6,321,732 B1 | 11/2001 | Kotwicki et al. | |
| 6,760,656 B2 | 7/2004 | Matthews et al. | |
| 7,027,905 B1 | 4/2006 | Mladenovic et al. | |
| 7,567,049 B2 | 7/2009 | Shahi | |
| 2008/0095638 A1 * | 4/2008 | Branecky | 417/43 |

* cited by examiner

*Primary Examiner* — Anh Mai
*Assistant Examiner* — Brenitra M Lee
(74) *Attorney, Agent, or Firm* — Senniger Powers LLP

(57) ABSTRACT

A method of correcting fluid flow offset for an uncharacterized fluid handling system including a motor. The method includes running the motor at a reference fluid flow demand using generic coefficients, and changing fluid flow demand from the reference fluid flow demand until the motor signals a power limit condition. When the motor signals the power limit condition, the fluid flow demand is noted. The operational fluid flow demands are scaled by a ratio of the noted fluid flow demand to the reference fluid flow demand.

16 Claims, 2 Drawing Sheets

FLOW CONTROL FOR FLUID HANDLING SYSTEM

BACKGROUND

This disclosure generally relates to blower systems (also referred to as air handler systems) and other fluid handling systems, and more particularly to controls for such systems.

Heating, ventilation and/or air conditioning ("HVAC") systems commonly have blower systems for moving air. These blower systems typically include a fan (such as a squirrel cage fan), an electric motor for powering the fan, and a control for the electric motor. In some systems, the control receives a signal corresponding to airflow demand from a system controller, such as a thermostat. The control determines a motor torque needed to meet the airflow demand and sends a signal to the motor to provide the needed torque so the fan produces the demanded airflow. Therefore, to accurately provide the demanded airflow, the control must accurately determine the torque demand needed to provide the airflow demand.

A variety of methods is used to characterize a system so that airflow demands can be converted to torque demands. For example, U.S. Pat. Appn. Pub. No. 2007/0248467 A1 describes a method for producing a torque demand from an airflow demand using an equation such as:

$$T = K1 + K2*s + K3*A + K4*s*A^2,$$

where T represents the torque demand in Newton meters (Nm), s represents motor speed in revolutions per minute (rpm) and A represents the airflow demand in cubic feet per minute (cfm). K1, K2, K3 and K4 are constants derived for a particular blower system. These constants are derived from torque, speed and airflow data collected for the particular blower system. Other equations (e.g., higher order equations) may be used to calculate airflow demands from torque demands. Regardless of the particular equation used, constants must generally be determined for each system because the constants vary with various system parameters such as fan type, surrounding pressure, and surrounding temperature, as well as downstream parameters such as duct configuration, filter type, and filter condition. The process of determining constants for a system is referred to as system characterization.

System characterization is usually performed in a calibrated test chamber, measuring airflow, blower speed and torque at different static pressures representing different downstream conditions. Characterization is generally a lengthy process and each system must be separately characterized. Systems are difficult to characterize when installing motors in the field such as when replacing a used motor to repair a blower system. Thus, there is a need for a method of characterizing systems in the field without using a calibrated test chamber that minimizes prediction errors when converting an airflow demand (or another system demand) into a torque demand.

SUMMARY

In one aspect of the present invention, a method of correcting fluid flow offset for an uncharacterized fluid handling system including a motor. The method comprises running the motor at a reference fluid flow demand using generic coefficients and changing fluid flow demand from the reference fluid flow demand until the motor signals a power limit condition. Further, the method includes noting the fluid flow demand when the motor signals the power limit condition, scaling operational fluid flow demands by a ratio of the noted fluid flow demand to the reference fluid flow demand.

In another aspect, the present invention includes a method of correcting fluid flow offset for an uncharacterized fluid handling system including a motor. The method comprises running the motor at a reference fluid flow demand using generic coefficients, measuring actual fluid flow demand. In addition, the method includes scaling operational fluid flow demands by a ratio of the measured fluid flow demand to the reference fluid flow demand.

Other aspects of the present invention will be in part apparent and in part pointed out hereinafter.

BRIEF DESCRIPTION OF DRAWINGS

Corresponding reference characters indicate corresponding parts throughout the several views of the drawings.

DETAILED DESCRIPTION

Figure 1:
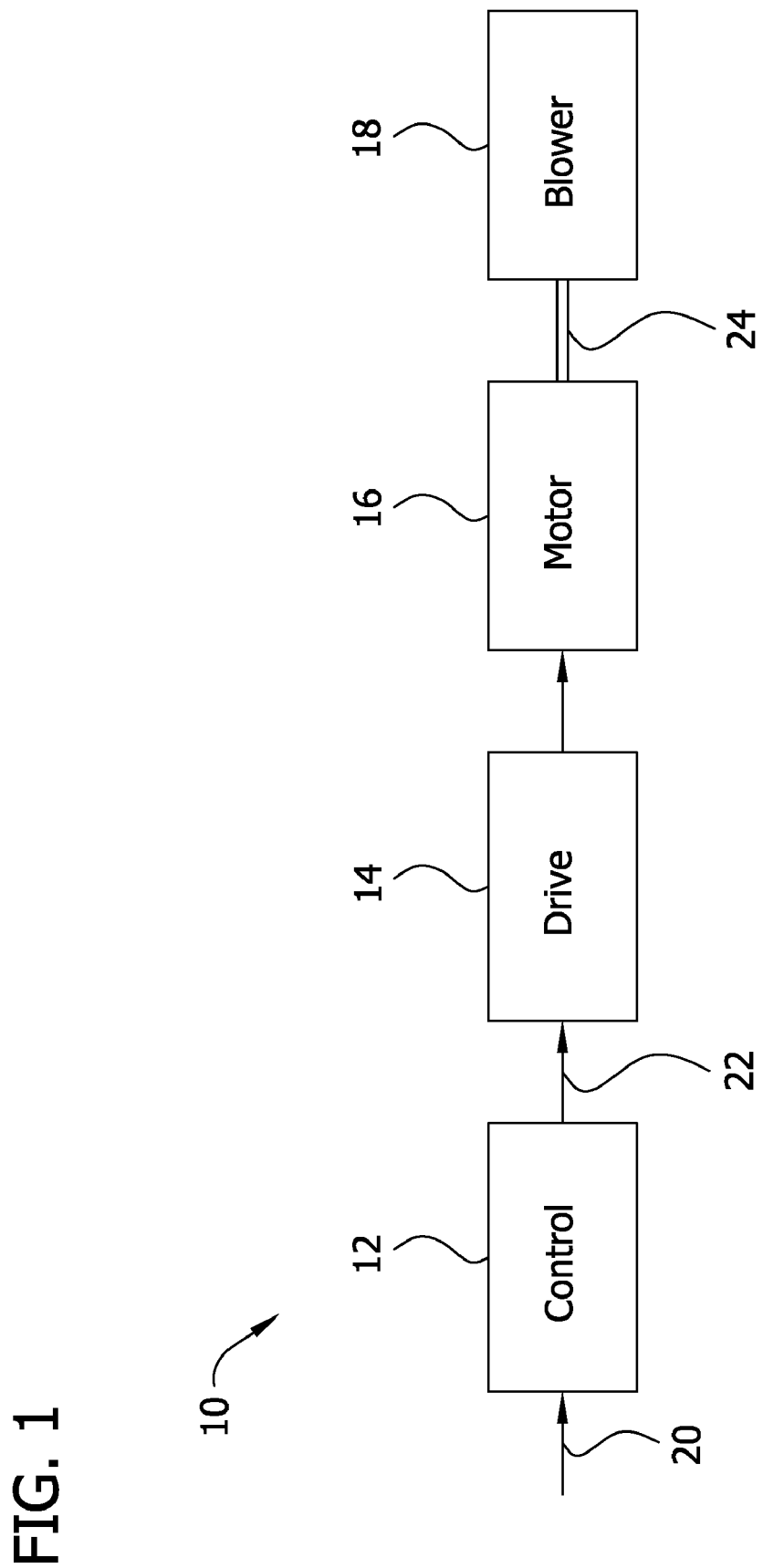
FIG. 1 is a block diagram of a blower system according to one embodiment of the present disclosure.

As illustrated in FIG. 1, a blower system according to one embodiment of the present invention is designated in its entirety by the reference number 10. The blower system 10 includes a blower control 12, a motor drive 14, an electric motor 16 and a blower 18. The control 12 receives an airflow demand signal 20 from a system controller (not shown) such as a thermostat or multi-system controller. The control 12 produces a drive signal 22 for the motor 16 based on the airflow demand signal 20 using an equation having several terms. In one exemplary embodiment, these terms include a composite function such as $s*A^n$, where s is a speed of the electric motor in revolutions per minute (rpm), A is airflow demand in cubic feet per minute (cfm), and n is a whole number greater than one. By using such an equation for calculating a drive signal 22 from the airflow demand signal 20, the control 12 can more accurately account for non-linearities between the airflow demand and other system parameters.

As further illustrated in FIG. 1, the control 12 provides the drive signal 22 to the drive 14. The drive 14 energizes the electric motor 16 to rotate its output 24 in accordance with the drive signal 22. When the motor 16 is energized, its output 24 rotates, driving the blower 18 for blowing air. In some embodiments, the blower 18 is a squirrel cage fan. Although not shown in FIG. 1, the control 12 may receive feedback from the motor 16 indicating motor speed, output torque and/or position (e.g., rotor position). Although the control 12, the drive 14 and the motor 16 are depicted as physically separate components in FIG. 1, those skilled in the art will appreciate that some or all of these components may be combined in a single package without departing from the scope of the present invention. As will also be apparent to those skilled in the art, the blower system 10 of FIG. 1 is well suited for HVAC and other applications.

Figure 2:
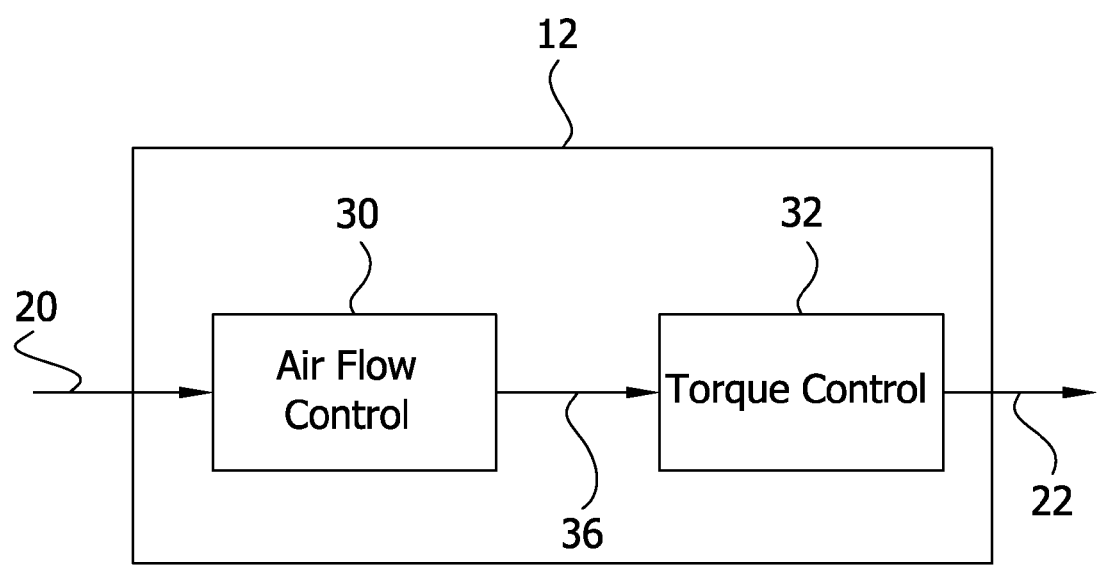
FIG. 2 is a block diagram of the control of FIG. 1 according to one particular embodiment.

FIG. 2 illustrates one embodiment of the control 12 shown in FIG. 1. In the embodiment of FIG. 2, the control 12 includes an airflow control module 30 and a torque control module 32. As shown in FIG. 2, the airflow control module 30 converts the received airflow demand signal 20 into a torque demand signal 36. The torque control module 32 converts the torque demand signal 36 into the drive signal 22 for the demanded motor torque. The airflow control module 30 is configured to produce the torque demand signal 36 using an equation having several terms as described above. As will be apparent to those skilled in the art, the control modules 30, 32 generally illustrated in FIG. 2 can be implemented in hardware or software in a variety of manners. For example, in some embodiments, the control modules are implemented using digital signal processors.

In one exemplary embodiment of the present invention, coefficients are determined using a generic blower setup. As mentioned above, U.S. Pat. Appn. Pub. No. 2007/0248467 A1 describes a few methods for characterizing a blower system. The entire disclosure of this publication is incorporated by reference. The described methods involve determining system coefficients using a regression analysis on test data obtained from a particular system. The same methods may also be used to determine generic coefficients from test data obtained from a generic system built to represent a typical system. Alternatively, formula commonly understood by those skilled in the art may be used to calculate generic coefficients without running experiments. Even though these generic coefficients are not precisely accurate for particular systems in the field, they will provide more constant airflow control when used for an uncharacterized system than running the system in torque mode or in speed mode. Even though loading conditions or some components of the blower system may be different than those for which the generic coefficient conditions were derived, an uncharacterized system using the generic coefficients will maintain a generally constant airflow. But the uncharacterized system may have an offset difference between the demanded airflow and the actual airflow delivered by the system. The following methods may be used to at least partially correct this offset in airflow so the uncharacterized system can use the generic coefficients.

A first method of correcting airflow offset for an uncharacterized blower system in the field can be accomplished by running the motor at a demanded reference airflow using generic coefficients. In one example, the ductwork in the house is typical and the air filter is clean so the generic coefficients provide a reasonable approximation of the actual coefficients that would be derived if the system were tested. Airflow demand is increased or decreased from the reference airflow until the motor signals a power limit condition. The airflow at the power limit condition is called maximum airflow. The maximum airflow is noted and is provided to the motor as the maximum airflow parameter. All the airflow demands are scaled from this maximum airflow to determine the offset.

Example 1

In a first example, a five ton cooling system was tested in a test facility. The system was built in a conventional manner to replicate a typical residential cooling system. The system required 400 cubic feet of air per minute per ton. The maximum required airflow for the five ton system at 400 cubic feet per minute per ton was 2000 cubic feet per minute (cfm)(i.e., 5 tons×400 cfm/ton). The motor of the cooling system was first run using generic coefficients and an initial demand equal to about 75% of the maximum required airflow (i.e., 1500 cfm or 0.75×2000 cfm). The power limit of the motor was monitored as the demand was gradually increased in 50 cfm increments. When the power limit was reached, the airflow demand input to the motor was recorded as the maximum airflow. In this case, the maximum airflow was 1800 cfm when the power limit was reached. A scale factor equal to the ratio of the maximum required airflow (i.e., 2000 cfm) to the airflow demand at the power limit condition (i.e., 1800 cfm) was used to scale the demand signaled from the control. (Those skilled in the art will appreciate that the demand scale factor may be stored in the motor control or in an alternate location.) In the system tested, the scale factor was 2000/1800 or 1.111. This scale factor was used to scale the demand signaled from the system controller. For example, when the system controller signaled to give 600 cfm for a continuous fan mode, the actual demand sent to the motor was 667 cfm (i.e., 1.111×600 cfm). The system was run at ten different test conditions as described above with a demand of 2000 cfm from the system controller and airflow data was collected for each run. The data collected is shown in Table 1.

TABLE 1

| Current Drawn by Motor (amps) | Motor Power (watts) | Motor Speed (rpm) | Airflow Provided (cfm) | Static Pressure (atmosphere) | Error from Maximum Airflow |
|---|---|---|---|---|---|
| 10.49887 | 1031.610 | 1067.377 | 2287.718 | 0.101326 | 14.09% |
| 10.42406 | 1025.612 | 1081.520 | 2238.118 | 0.198067 | 11.91% |
| 10.36996 | 1020.353 | 1093.312 | 2190.929 | 0.297693 | 9.55% |
| 10.36293 | 1016.003 | 1110.060 | 2151.341 | 0.396804 | 7.57% |
| 10.31060 | 1012.375 | 1120.674 | 2110.070 | 0.495687 | 5.50% |
| 10.30836 | 1008.549 | 1137.478 | 2065.420 | 0.601014 | 3.27% |
| 10.21676 | 1006.023 | 1155.279 | 2021.861 | 0.699018 | 1.09% |
| 10.17777 | 1000.722 | 1168.270 | 1975.552 | 0.802856 | −1.22% |
| 10.14655 | 999.5735 | 1183.037 | 1930.072 | 0.900955 | −3.50% |
| 10.13757 | 994.7858 | 1198.462 | 1881.622 | 1.001740 | −5.92% |

A second method of correcting airflow offset for an uncharacterized blower system in the field can be accomplished by running the motor at a demanded reference airflow using the generic coefficients. Actual airflow is measured using any suitable device. All the airflow demands are scaled from this actual airflow to determine the offset.

Example 2

In a second example, a system was run using generic coefficients at a demand reference airflow of 800 cfm. The actual airflow was measured using a Model 407117 vane anemometer available from Extech Instruments Corporation of Waltham, Mass. At the demand reference airflow of 800 cfm, the anemometer measured 931 cfm at a static pressure of 0.5 atmosphere. The scale factor was calculated to be 1.164 (i.e., 931 cfm/800 cfm). The scale factor was stored as in Example 1 and used to scale the demand signaled from the system controller. The system was run three times with the demand reference airflow of 800 cfm and airflow data was collected for different static pressures. The data collected is shown in Table 2, demonstrating the scale factor provided about the same airflow at each static pressure, based on the 800 cfm demand reference airflow. The same scale factor of 1.164 may be used to achieve airflows other than 931 cfm by applying the scale factor to the desired provided airflow to generate the appropriate demand reference airflow.

TABLE 2

| Static Pressure (atmosphere) | Airflow Provided (cfm) | Error from Nominal Airflow |
|---|---|---|
| 0.70 | 903 | −3.01% |
| 0.52 | 931 | 0.00% |
| 0.30 | 959 | 3.01% |

Although various blower system embodiments have been described above, it should be understood that the teachings of this disclosure can also be applied to other types of fluid handling systems, including for example air and liquid pumps, without departing from the scope of the present invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that several advantages are achieved by the present invention.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of correcting fluid flow offset for an uncharacterized fluid handling system including a motor, said method comprising:
    running the motor at a reference fluid flow demand using generic coefficients;
    changing fluid flow demand from the reference fluid flow demand until the motor signals a power limit condition;
    noting the fluid flow demand when the motor signals the power limit condition; and
    scaling operational fluid flow demands to the noted fluid flow demand.

2. A method as set forth in claim 1 wherein said generic coefficients are determined from test data.

3. A method as set forth in claim 2 wherein said generic coefficients are determined by regression analysis of the test data.

4. A method as set forth in claim 1 wherein said generic coefficients consist of K1, K2, K3 and K4 used in a torque demand equation having the form $T=K1+K2*s+K3*A+K4*s*A^2$, where T represents the torque demand in Newton meters, s represents motor speed in revolutions per minute and A represents the fluid flow demand in cubic feet per minute.

5. A method as set forth in claim 1 wherein said method is performed by the motor on first start up.

6. A method as set forth in claim 1 wherein said method is performed by the motor during a test mode.

7. A method as set forth in claim 1 wherein the uncharacterized fluid handing system for which the method is performed comprises a blower.

8. A method as set forth in claim 1 wherein the uncharacterized fluid handing system for which the method is performed comprises a pump.

9. A method of correcting fluid flow offset for an uncharacterized fluid handling system including a motor, said method comprising:
    running the motor at a reference fluid flow demand using generic coefficients;
    measuring actual fluid flow; and
    scaling operational fluid flow demands by a ratio of the measured fluid flow to the reference fluid flow demand.

10. A method as set forth in claim 9 wherein said generic coefficients are determined from test data.

11. A method as set forth in claim 10 wherein said generic coefficients are determined by regression analysis of the test data.

12. A method as set forth in claim 9 wherein said generic coefficients consist of K1, K2, K3 and K4 used in a torque demand equation having the form $T=K1+K2*s+K3*A+K4*s*A^2$, where T represents the torque demand in Newton meters, s represents motor speed in revolutions per minute and A represents the fluid flow demand in cubic feet per minute.

13. A method as set forth in claim 9 wherein said method is performed by the motor on first start up.

14. A method as set forth in claim 9 wherein said method is performed the motor during a test mode.

15. A method as set forth in claim 9 wherein the uncharacterized fluid handing system for which the method is performed comprises a blower.

16. A method as set forth in claim 9 wherein the uncharacterized fluid handing system for which the method is performed comprises a pump.

* * * * *